D. H. FLEMING.
FORMATION TANK.
APPLICATION FILED APR. 7, 1920.
1,348,000.
Patented July 27, 1920.
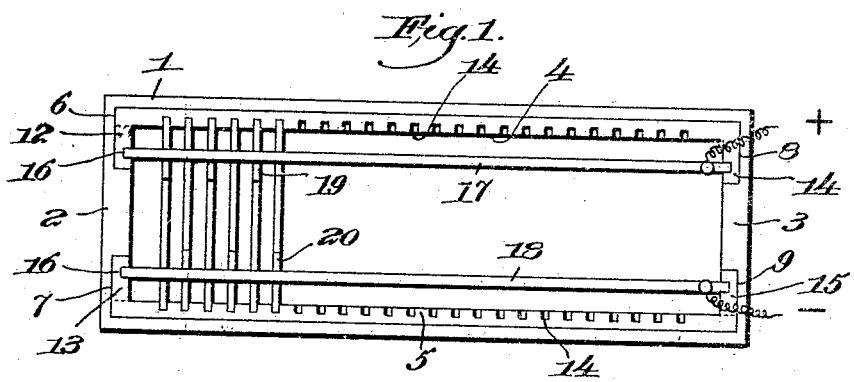
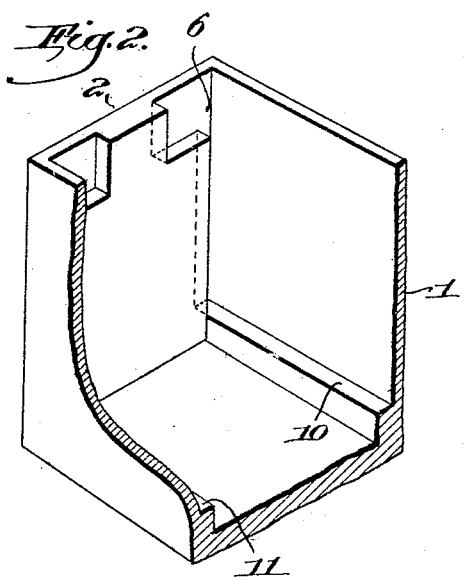
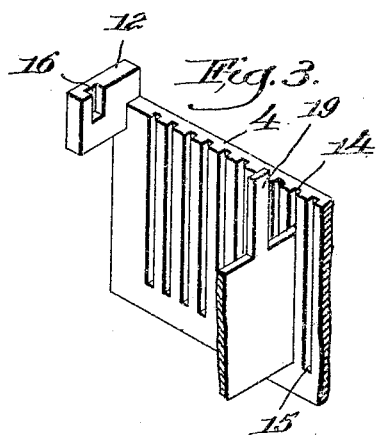
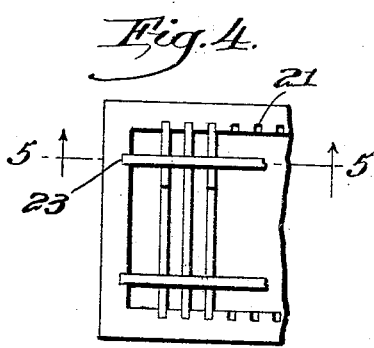
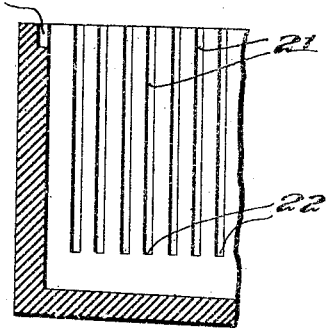
Inventor:
David H. Fleming,
by Roberts Roberts & Cushman
his Attys.

UNITED STATES PATENT OFFICE.

DAVID H. FLEMING, OF BOSTON, MASSACHUSETTS.

FORMATION-TANK.

1,348,000.   Specification of Letters Patent.   Patented July 27, 1920.

Application filed April 7, 1920. Serial No. 371,905.

*To all whom it may concern:*

Be it known that I, DAVID H. FLEMING, a subject of the King of Great Britain, and resident of Boston, in the county of Suffolk and State of Massachusetts, have invented new and useful Improvements in Formation-Tanks, of which the following is a specification.

In the formation of battery plates for storage batteries it is customary to construct grids having openings therein to receive a chemical composition which is filled into the openings in the form of a paste, after which the plates are placed in a formation tank or tray containing an acid composition, alternate plates being connected to the opposite terminals of a current source, and current is passed through the plates and solution for a period of time to convert the composition in the plates into the ultimate form adapted for storage battery uses. The formation tanks or trays heretofore used have consisted of elongate boxes somewhat wider than the width of the battery plates, and slightly deeper than the depth of the plates, the tanks or trays usually being formed of lead or some other metallic acid resistant substance. The plates are placed in these tanks transversely in spaced relationship with their conducting lugs or terminals projecting upwardly. The lugs of the plates are usually placed near one side of the plates and in placing the plates in the formation tanks the plates are so disposed that the lugs of alternate plates project upwardly in staggered relationship. The plates are usually positioned by means of a plurality of racks and wedges formed of wood or the like in order to hold the plates in spaced relationship out of electrical contact with the walls of the tank which is formed of conductive material. After the plates are secured in position conducting rods or bus-bars are temporarily soldered or welded to the upstanding terminal lugs of the plates, one bar being connected to the alternate lugs disposed nearer one side of the tank and the other bar being connected to the alternate lugs disposed nearer the opposite side of the tank. After the plates have been connected to the bus-bars and after the plates have been submerged with the acid composition, the current is passed through the plates and solution for the required period of time.

The tanks heretofore used have involved many disadvantages among which may be mentioned the following: Owing to the fact that the tanks are formed of conducting material considerable time and care is involved in positioning the plates in the tank so that they do not contact with the walls of the tank and thereby form a short-circuit between the plates. The wedges and shims used to position the plates require skill and time in manipulation in order properly to secure the plates. These wedges and shims are also seriously affected by the acid composition so that they are short lived. With this method of holding the plates in spaced relationship, it is difficult to space the plates uniformly so as to produce a uniform action on the respective plates. Another difficulty is involved in supporting and positioning the bus-bars out of contact with the metallic tank while the bars are being soldered to the terminal lugs of the plates. Furthermore the metallic tanks are heavy and difficult to handle.

The principal objects of the present invention are to provide an improved formation tank or tray which will eliminate all of the aforesaid difficulties and enable the battery plates to be quickly placed in the tanks and removed therefrom with unskilled labor, which will avoid all danger of short-circuiting, which will be more durable but at the same time lighter in weight, which provides means for supporting and positioning the bus-bars while they are being connected to the terminal lugs, and which is generally superior to tanks heretofore used.

In order more clearly to disclose the nature of my invention I have illustrated certain embodiments in which:—

Figure 1 is a top plan of one embodiment showing a few battery plates in position and showing the bus-bars in position;

Fig. 2 is a perspective view of one end of the tank shown in Fig. 1, parts being removed and other parts being broken away.

Fig. 3 is a perspective view of a part of the tank in Fig. 1, a part being broken away;

Fig. 4 is a top plan of another embodiment of the invention, parts being broken away; and Fig. 5 is a vertical longitudinal section on line 5—5 of Fig. 4.

The particular embodiment of the invention shown in Figs. 1, 2 and 3 comprises an outside casing 1 having ends 2 and 3 and detachable inside portions 4 and 5. The outside casing 1 is formed with vertical slots 6, 7, 8 and 9 at its corners, to receive the ends of the members 4 and 5. The side walls of the casing are provided near the bottom with shoulders 10 and 11 adapted to support the side members 4 and 5. The members 4 and 5 are provided at their upper corners with lugs or flanges 12, 13, 14 and 15 which are adapted to fit into corresponding recesses in the ends of the casing 1. The members 4 and 5 are provided with vertical slots 14 adapted to receive the battery plates, the bottoms of these slots terminating in shoulders 15 adapted to limit the downward movement of the plates and to support the plates in spaced relationship to the bottom of the tank. The lugs or flanges 12, 13, 14 and 15 are provided with recesses 16 adapted to receive the ends of the bus-bars 17 and 18 in juxtaposition to the lugs 19 and 20 of the alternate plates respectively.

With the construction shown in Figs. 1, 2 and 3 the outside portion 1 of the tank may be formed either of conducting or non-conducting material inasmuch as the battery plates do not contact therewith. The inside portions 4 and 5 are made of insulating material so as to insulate the plates from each other and from the tank. Inasmuch as the bus-bars are supported on the lugs or flanges 12, 13, 14 and 15 of the insulation members 4 and 5 the bus-bars are also insulated from the outside portion of the tank.

In using the apparatus the plates are slipped into the slots 14 and after the plates are all in position the bus-bars 17 and 18 are dropped into the recesses 16 which automatically support and position the bus-bars in contact with the terminal lugs 19 and 20, respectively. By means of a blow torch the bus-bars are then temporarily soldered or welded to the juxtaposed terminal lugs 19 and 20. The acid composition is finally poured into the tank. Current is then passed through the apparatus for the required period of time after which the plates may be simultaneously removed from the tank by lifting the bus-bars. After the plates have been removed as a unit they may be readily detached from the bus-bars.

In the embodiment shown in Figs. 4 and 5 the entire tank is formed in a single piece of insulating material so that both the inside and outside portions are insulated. In this embodiment the slots 21 are formed in the inner faces of the side walls of the tank and terminate in shoulders 22 to support the plates. The recesses 23 for supporting and positioning the bus-bars are formed in the inner upper side of the end walls of the tank. The operation of the embodiment shown in Figs. 4 and 5 will be evident from the preceding description of the embodiment in Figs. 1 to 3.

Probably the most suitable insulating composition for the insulating portions of the first embodiment is hard rubber while in the case of the one-piece tank shown in Figs. 4 and 5, the best composition is probably crockery or porcelain. The slots and recesses are preferably molded in the insulating composition in the process of formation, in both embodiments.

I claim:

1. A formation tank for preparing storage battery plates comprising a liquid container, said container having a compartment substantially as wide as the storage battery plates to be prepared and sufficiently long to receive a series of plates in spaced transverse relationship, said compartment having vertical grooves in its opposite sides to receive and hold the plates in position, said grooves terminating in shoulders somewhat above the bottom of the container to support the plates in spaced relationship to the bottom of the container, the portions of said container having said grooves and shoulders being formed of acid resisting and electrically insulating material.

2. A formation tank for preparing storage battery plates comprising a liquid container, said container being substantially as wide as the storage battery plates to be prepared and being sufficiently long to receive a series of plates in spaced transverse relationship, said container having vertical grooves in its opposite sides to receive and hold the plates in position, said grooves terminating in shoulders somewhat above the bottom of the container to support the plates in spaced relationship to the bottom of the container, and the end walls of said container having recesses to receive and hold conducting bars in juxtaposition to the terminal lugs extending from the battery plates, the portions of said container having said grooves and recesses being formed of acid resisting and electrically insulating material.

3. A formation tank for preparing storage battery plates comprising a liquid container, said container being adapted to receive a series of plates in spaced transverse relationship, and the end walls of the said container having recesses to receive and hold conducting bars in juxtaposition to the terminal lugs extending from the battery plates, the portions of said container having said recesses being formed of electrically insulating material.

Signed by me at Boston, Massachusetts, this 3rd day of April, 1920.

DAVID H. FLEMING.